United States Patent [19]

Takeda

[11] 4,253,226
[45] Mar. 3, 1981

[54] METHOD FOR MOUNTING UP A PLASTIC FASTENER

[76] Inventor: Tadashi Takeda, 12-banchi, 1-chome, Kitakinomoto, Yao-shi, Osaka-fu, Japan

[21] Appl. No.: 60,518

[22] Filed: Jul. 25, 1979

[51] Int. Cl.³ .............................................. B23P 11/00
[52] U.S. Cl. ...................................... 29/432.1; 29/509; 29/522 R; 24/208 A; 264/249
[58] Field of Search ..................... 29/432, 432.1, 432.2, 29/509, 522 R; 264/249; 24/208 A, 208 R, 214, 216, 217

[56] References Cited

U.S. PATENT DOCUMENTS

| | | | |
|---|---|---|---|
| 3,107,408 | 10/1963 | Huelster et al. | 24/208 A |
| 3,159,890 | 12/1964 | Jensen | 24/214 |
| 3,195,201 | 7/1965 | Ash | 24/208 A |
| 3,310,871 | 3/1967 | Humiston | 29/432.2 |
| 3,349,451 | 10/1967 | Maeno | 24/208 A |
| 3,355,780 | 12/1967 | Daddona | 24/208 A |
| 3,401,434 | 9/1968 | Daddona | 24/208 A |
| 3,499,808 | 3/1970 | Obeda | 264/249 |
| 3,553,796 | 1/1971 | Carlile | 264/249 X |
| 3,777,966 | 12/1973 | Green | 29/432.2 X |
| 3,869,766 | 3/1975 | Raymond | 24/208 A X |

Primary Examiner—Charlie T. Moon
Attorney, Agent, or Firm—Edwin E. Greigg

[57] ABSTRACT

A base with a central aperture and a post having an axially outwardly open hollow-tipped stem are mounted on a supporting sheet piece to make up either a stud or a socket of a plastic snap fastener. The base is placed in proper position on one side of the supporting piece, while the post is aligned with it on the other side of the supporting piece and is forced to pierce therethrough and to extend through the aperture in the base. The mounting is completed by crashing the hollow walls of the stem under axial pressure while exerting radially inwardly contracting force upon the open hollow tip brim of the stem.

3 Claims, 8 Drawing Figures

४,253,226

METHOD FOR MOUNTING UP A PLASTIC FASTENER

BACKGROUND OF THE INVENTION

This invention relates to a method for mounting up a plastic snap fastener element comprised of a base with a central aperture and of a post having a stem adapted to pierce through a supporting sheet piece and to extend through the aperture in the base.

As a method for mounting up a snap fastener of the type described, it has conventionally been well known, as per FIG. 5 of the accompanying drawings given to be referenced for this purpose, to prepare the stem 6 with an open-tipped axial central bore of a small diameter 8 formed for facilitating plastic deformation of the stem 6, so as to force the same to pierce through the supporting piece A and extend through the aperture 4 in the base 1, to heat and soften the tubular stem 6 in such state and to crush the same by axial pressure while thereby causing the same to expand radially outwardly; but such has been accompanied by serious drawbacks with respect to the efficiency of the mounting work as well as the resulting strength of the mounted assembly.

Namely, it takes a long time since the tubular stem 6 is first heated and softened and is them crushed under pressure for causing the mounting, and accordingly the efficiency of the mounting work is quite low.

On the other hand, if the process of forcing the stem 6 to pierce through the supporting piece and crushing the same is repeated at a high speed such as tens of or hundreds of times per minute, then each stem 6 can hardly be heated and softened in the short retaining time allotted thereto, even though the crushing tool, such as a hammer or the like, is equipped with heater means incorporated therein for the purpose of the heating and softening. The stem 6 will therefore substantially in a cold process be crushed under axial pressure while the open hollow tip brim thereof is thereby expanded radially outwardly, and as the outward expansion proceeds there will inevitably occur cracks in the said brim portion so that the closure head formed thereon by the crushing deformation in clamping engagement with edges around the aperture 4 will be in a petaloid or stellate shape, whose projections are apt to chip off, resulting in failure of sufficient clamping strength of the mounted assembly. Specifically, when the supporting sheet piece A is a woven fabric as is normally the case in clothes, walls of the tubular stem 6 must be sufficiently thick in order to make the stem rigid enough to forcibly pierce through the fabric, then however the stem 6 has the outer diameter too large to anyhow push its way through the fabric mesh space forcibly widening same by shoving aside the woven threads, and so the threads of the fabric come inevitably in the way as the stem 6 is forced to pierce through the fabric, causing danger of splitting thereby the tubular stem 6. On account thereof, it is required to make the walls of the tubular stem 6 as thin as possible and to make tip ends thereof sharply pointed, but the thinner the walls, the weaker will be the clamping strength as is attained by the petaloid or stellate closure head formed by the crushing deformation as described hereinabove in clamping engagement with edges around the aperture 4, as may thus result in such poor mounted assembly of the base 1 and the post 5 as are apt to be separated from each other off the assembly by stresses as are caused when the clothes are washed, as will thus substantially impractical.

SUMMARY OF THE INVENTION

In view of the actual status as above, this invention is for providing a method for mounting a plastic snap fastener on a supporting sheet piece as will enable to mount the snap fastener efficiently at a high speed while guaranteeing sufficient strength of the mounted assembly.

The method according to this invention is characterized, in mounting on the supporting piece the snap fastener element comprised of a base with a central aperture and of a post having an axially outwardly open hollow-tipped stem adapted to pierce through the supporting piece and to extend through the aperture in the base, thus of the type as already mentioned, in such a manner comprising the steps of placing the base in proper position on the supporting piece, aligning the post therewith, forcing the stem of the post to pierce through the supporting piece and to extend through the aperture in the base and causing substantial wall portions of the hollow stem portion to plastically deform radially outwardly to form a clamping closure head on the stem, as is known in the art also as already mentioned; in that the plastic deformation of the stem walls is made by applying axial pressure to the stem while exerting radially inwardly contracting force upon the open hollow tip brim of the stem.

On account of this characteristic feature, the open hollow tip brim of the stem, which is the portion conventionally apt to be cracked as described hereinabove, is now subjected to radially inwardly contracting plastic deformation, while the relatively stronger axially inner body portions of the stem walls are subjected to radially outwardly expanding deformation. Therefore, the stem walls undergo plastic deformation to take a state twofold in axial direction, with the initial open hollow tip brim portion retained to be peripherally continuous without any cracks even when the stem walls are crashed in a high speed operation without any aubstantial heating and softening, thus enabling to realize sufficient strength of the mounted assembly while enhancing the working efficiency by speeding up the repeated operations.

Further objects of and advantages accruing from this invention will become clear from the detailed description to follow hereunder.

DESCRIPTION OF THE PREFERRED EMBODIMENTS

Figure 1:
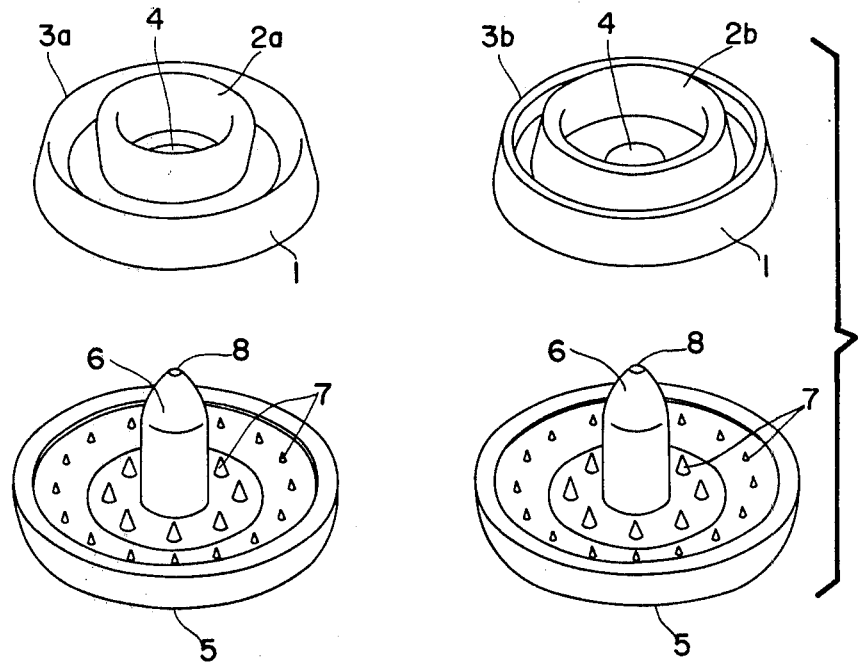
FIG. 1 is a perspective view of the parts to make up a complete pair of interengageable plastic snap fastener stud and socket.

Describing this invention in detail with reference to the drawings, the method according thereto may be practiced on parts shown in FIG. 1 for making up a complete pair of interengageable plastic (for instance acetal resin) snap fastener units. Designated at 1, 1 are the respective base elements interengageable with each other, and the one, which is a stud element base 1, has on one face thereof a stud head 2a in the form of upstanding inner circular flange and a rib 3a in the form of upstanding outer circular flange, these two circular flanges being formed coaxial with each other, and a central aperture 4 is formed on radially still inner side of the stud head 2a. The other one, which is a socket element base 1, likewise has on one face thereof a socket head 2b in the form of upstanding inner circular flange and a rib 3b in the form of upstanding outer circular flange, these two circular flanges being formed coaxial with each other, and a central aperture 4 is formed on radially still inner side of the socket head 2b. Designated at 5, 5 are posts of one and the same construction commonly for both of the stud and socket elements 1, 1, and each post has on one face thereof a integral central stem 6, of outer diameter suitable to be fitted in the aperture 4 in the base 1, with a pointed tip, and has arranged therearound a series of integral nibs 7. In the stem 6 there is formed an axially extending central bore 8 of a small diameter, thus providing a tubular stem open only to the tip end thereof.

Figure 2:
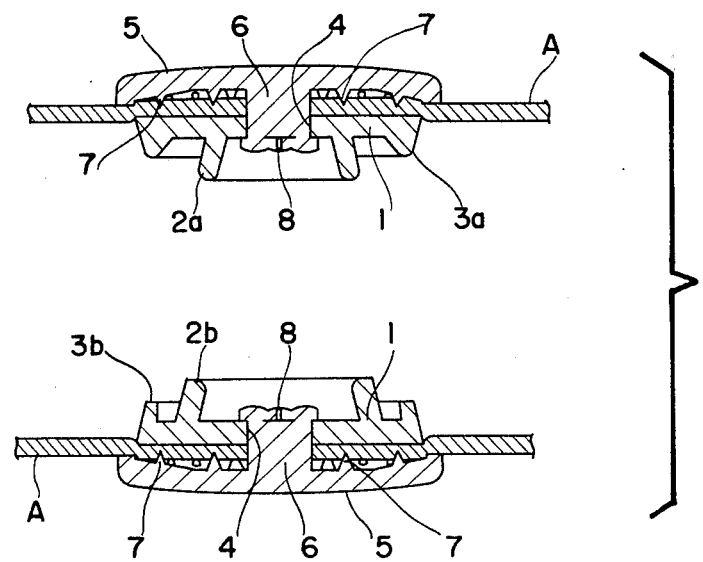
FIG. 2 is a central section showing the stud and socket units made of the parts of FIG. 1 assembled to and mounted on the respective supporting sheet pieces.
Figure 3:
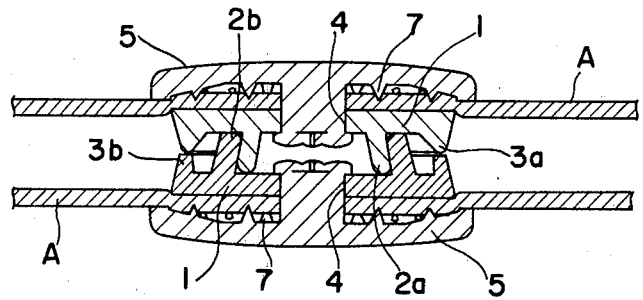
FIG. 3 is a central section of the stud and socket units of FIG. 2, now snapped into the interengaging state thereof.
Figure 4A:
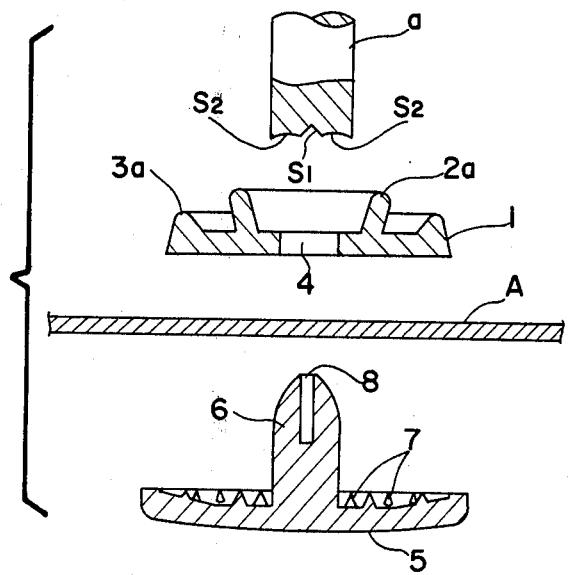
FIGS. 4(a-d) are central sections of a pair of base and post in the respective stages of the process of mounting same on a supporting sheet piece according to this invention.
Figure 4B:
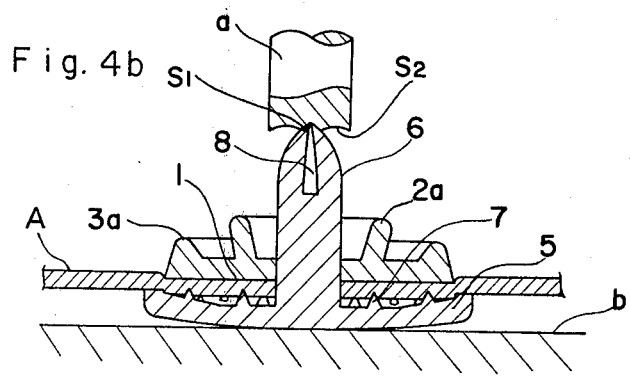
Figure 4C:
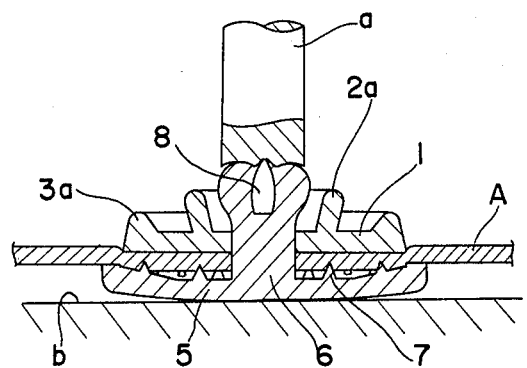
Figure 4D:
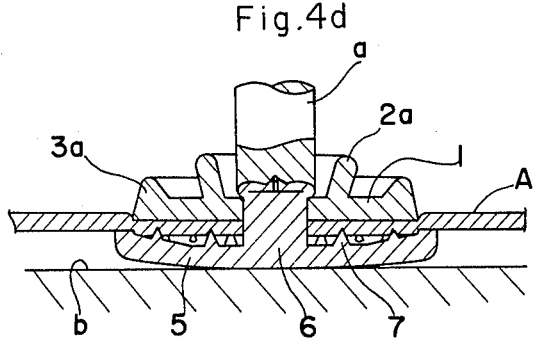
Figure 5:
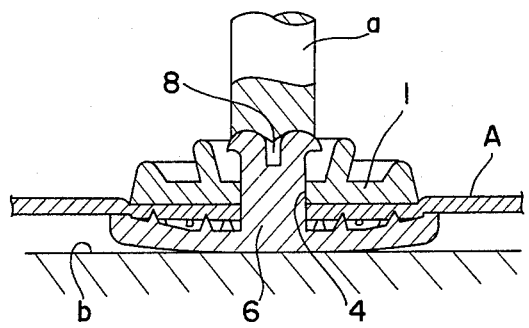
FIG. 5 is a central section of a pair of base and post at a stage of the conventional process of mounting same on a supporting sheet piece.

FIG. 2 shows a pair of stud and socket units respectively made up by mounting the base 1 and the post 5, according to this invention, on the respective supporting sheet pieces A, for instance fabric pieces; while FIG. 3 shows the stud and socket units in the state with the stud head 2a and the socket head 2b snapped into clamping interengagement with each other. In this clamping interengagement state, the circular flange-shaped ribs 3a, 3b are in abutment or very close to each other, thus functioning to restrict tilting movement of the stud element and socket element bases 1, 1 relative to each other, while the nibs 7, 7 provided on the respective posts 5, 5 are in forced firm biting into the respective supporting sheet pieces A, A, thus functioning to hamper displacement of the fastener units relative to the supporting pieces and therefore to prevent fraying of the woven fabric threads. Here in this respect, the circular flange-shaped ribs 3a, 3b have the reinforcing effect to restrict deformation of the respective bases 1, 1 (bending deformation thereof to turn off the supporting pieces) and thus serve to reassure the fray-preventing function of the nibs 7, 7.

The plastic snap fastener described hereinabove is mounted on the supporting sheet piece A in a manner as follows:

Referring to FIGS. 4(a and b), the stud element base 1 is placed in proper position on one side of the supporting piece A while the post 5 is aligned with it on the other side of the supporting piece A, and axial pressure is applied via a cooperating pair of a hammer tool a and an anvil b to forcibly assemble the base 1 and the post 5 to come closer to each other, with the stem 6 of the post 5 piercing its way through the interposed supporting piece A. The hammer tool a has a forming surface with a central conical groove $S_1$, pointed upwardly as viewed in the illustration to receive therein the open hollow tip brim of the stem 6, surrounded by an annular groove $S_2$ whose inner brim portion directly around the outer brim of the central conical groove $S_1$ is tapered in the way opposite to the central conical tapering. The tapering of the walls of the groove $S_2$ shows gradual change radially outwardly from the inner brim portion, to make the groove $S_2$ in annular depression shape as mentioned already.

Therefore, as the hammer tool a and the anvil b come closer to each other, tip end brim portion of the stem 6 extending through the central aperture 4 of the base 1 is guidedly received in the central conical groove $S_1$ of the hammer tool a and is subjected to axial pressure together with radially inwardly contracting force as is exerted thereupon. Continued axial movement forced by the forming tool will accordingly cause crashing plastic deformation of the stem walls, as shown in FIGS. 4(c and d), in the radially inwardly contracting direction at the tip brim portion and in the radially outwardly expanding direction at the axially inner body portions.

The mounting operation as described hereinabove may actually be performed at such high speed of about 300 units per minute, supposition being here made that no heater means for heating and softening the tubular walls of the stem 6 is provided either in the hammer tool a, anvil b or anywhere around and that the crashing plastic deformation of the stem walls is performed as a cold process. Needless to say, it may however be preferable to provide suitable heater means in the hammer tool a, anvil b and/or somewhere around, thus to perform the crushing plastic deformation of the stem walls while heating and softening same.

The air occupying the central bore 8 of the stem 6 should preferably be confined tightly enough, by the hammer tool a, not to eacape to the outside until immediately before completing the crushing plastic deformation of the stem walls. Thus the pressure of the confined air increases higher and higher as the hammer tool a and the anvil b come closer to each other, and contributes to enhancing the radially outwardly expanding deformation of the axially inner body portions of the stem walls.

Since the attaching device and the process are the same for the socket of the snap fastener as those for the stud as described hereinabove, repetition is omitted for the socket.

I claim:

1. In a method for mounting on a supporting sheet piece a plastic snap fastener element comprised of a base with a central aperture and of a post having an axially outwardly open hollow-tipped stem adapted to pierce through the supporting piece and to extend through the aperture in the base, comprising the steps of placing the base in proper position on one side of the supporting piece, aligning the post therewith on the other side of the supporting piece, forcing the stem of the post to pierce through the supporting piece and to extend through the aperture in the base and causing substantial wall portions of the hollow stem portion to plastically deform radially outwardly to form a clamping closure head on the stem, THE IMPROVEMENT comprising in that the plastic deformation of the stem walls is made by applying axial pressure to the stem while exerting radially inwardly contracting force upon the open hollow tip brim of the stem.

2. The method of claim 1, characterized in that the plastic deformation of the stem is performed as a cold process.

3. The method of claim 1 or 2, characterized in that air occupying the space in the hollow tip portion of the stem is confined tightly enough not to escape to the outside until immediately before completing the plastic deformation of the stem.

* * * * *